(12) United States Patent
Shroff et al.

(10) Patent No.: US 8,327,276 B2
(45) Date of Patent: Dec. 4, 2012

(54) COMMUNITY DRIVEN PRIORITIZATION OF CUSTOMER ISSUES

(75) Inventors: Sharat Shroff, Bellevue, WA (US); Justin D Ronco, Bellevue, WA (US); Joedy K Blackstad, Bothell, WA (US); Wilhelmina P Dietrich, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1152 days.

(21) Appl. No.: 11/464,063

(22) Filed: Aug. 11, 2006

(65) Prior Publication Data

US 2008/0040427 A1    Feb. 14, 2008

(51) Int. Cl.
G06F 15/16    (2006.01)
G06F 3/00    (2006.01)
G06Q 30/00    (2012.01)

(52) U.S. Cl. ........ 715/751; 715/205; 715/753; 715/758; 715/794; 709/204; 709/207; 705/7.28; 705/14.55

(58) Field of Classification Search .................. 715/751, 715/200, 201, 204, 205, 234, 753, 758, 759, 715/202, 203, 206, 208, 209, 226, 229, 231, 715/255, 256, 273, 700, 750, 760, 794, 797; 709/201, 202, 203, 204, 205, 206, 207, 217, 709/219, 223; 705/14.55, 300, 346, 7.27, 705/7.28, 7.29, 7.37, 7.38
See application file for complete search history.

(56) References Cited

U.S. PATENT DOCUMENTS

| | | | |
|---|---|---|---|
| 5,796,393 A * | 8/1998 | MacNaughton et al. | ..... 715/733 |
| 6,128,624 A | 10/2000 | Papierniak et al. | |
| 6,493,703 B1 * | 12/2002 | Knight et al. | ......................... 1/1 |
| 6,510,431 B1 | 1/2003 | Eichstaedt et al. | |
| 6,542,601 B1 | 4/2003 | Hernandez et al. | |
| 6,581,096 B1 * | 6/2003 | Cottrille et al. | ............... 709/223 |
| 6,965,865 B2 | 11/2005 | Pletz et al. | |
| 6,999,990 B1 * | 2/2006 | Sullivan et al. | ............... 709/205 |
| 7,082,458 B1 * | 7/2006 | Guadagno et al. | ............ 709/204 |
| 7,487,449 B2 * | 2/2009 | Mizuta | .......................... 715/700 |
| 7,594,176 B1 * | 9/2009 | English | ......................... 715/708 |
| 7,844,668 B2 * | 11/2010 | Canning et al. | ............... 709/206 |
| 8,024,408 B1 * | 9/2011 | Baldonado et al. | ........... 709/206 |
| 2001/0041988 A1 | 11/2001 | Lin | |
| 2003/0028525 A1 * | 2/2003 | Santos et al. | ...................... 707/3 |
| 2004/0143596 A1 * | 7/2004 | Sirkin | ........................ 707/104.1 |
| 2005/0125504 A1 * | 6/2005 | Leeds | ........................... 709/217 |
| 2005/0171853 A1 | 8/2005 | Fettig et al. | |
| 2006/0026011 A1 | 2/2006 | Verego et al. | |

(Continued)

OTHER PUBLICATIONS

Amat, "Using reporting and data mining techniques to improve knowledge of subscribers; applicat6ions to customer profiling and fraud management", Journal of Telecommunications and Information Technology, Feb. 2002, 5 pages.

(Continued)

*Primary Examiner* — Maikhanh Nguyen

(74) *Attorney, Agent, or Firm* — Lee & Hayes, PLLC

(57) ABSTRACT

Community driven prioritization of customer issues is described. In an implementation, a selectable portion of a user interface providing interaction with a community forum is selectable by a user to indicate agreement and associate with a posting in the community forum. The user may then automatically be provided results generated in response to the posting. In another implementation, associations matching a plurality of users and postings are utilized to assign priority to the postings and to prioritize responses to the postings.

15 Claims, 9 Drawing Sheets

U.S. PATENT DOCUMENTS

| | | | |
|---|---|---|---|
| 2006/0026049 A1 | 2/2006 | Joseph et al. | |
| 2006/0074603 A1 | 4/2006 | Matsunaga et al. | |
| 2006/0206818 A1* | 9/2006 | Utter et al. | 715/705 |
| 2007/0088827 A1* | 4/2007 | Starbuck et al. | 709/226 |
| 2007/0150812 A1* | 6/2007 | Hu | 715/705 |
| 2007/0172809 A1* | 7/2007 | Gupta | 434/350 |

OTHER PUBLICATIONS

Gunasekaran, et al., "Performance measures and metrics in a supply chain environment", International Journal of Operations & Production Management, vol. 21, Issue 1/2, Jan. 2001, pp. 71-87, Abstract printed on May 4, 2006 from website; http://www.emeraldinsight.com/Insight/viewContentItem.do?contentType=Article&hdActio..., 2 pages.

Lambert, et al., "Issues in Supply Chain Mangernent", Industrial Marketing Management 29, 2000, pp. 65-83.

* cited by examiner

500 

502
Providing one or more Selectable Portions in a User Interface Configured for interaction of a Plurality of Clients with a Community Forum, wherein each Selectable Portion Corresponds to a Posting and is Selectable by a User to Express Agreement with the Posting and to Associate with the Posting

504
Store a Plurality of Associations of Users with Postings in a Community Forum Responsive to Receiving Communication of User Selections of the Portions from one or more Clients

506
Determine Priority of Postings Based on the Associations

508
Form an Alert for Communication to One or More Recipients Enlisted to Respond to Postings Based on Priority Determined for One or More Posting

Fig. 5

COMMUNITY DRIVEN PRIORITIZATION OF CUSTOMER ISSUES

BACKGROUND

Increasingly, groups of users are using network based community forums to engage in back and forth discussions (threads) which may address almost any topic. A variety of community forums such as message boards, discussion threads, web logs (blogs), and the like are available to users over a network via applications such as browsers, instant messaging, email, chat, or the like. Using these community forums a user may make a posting which is exposed to the community or group of users, who may then respond to the original posting creating a thread. In some instances, community forums are used for support of services or products, or to otherwise get support or advice. Thus, postings in a forum may be directed at particular problems with services or products and may seek advice, answers and solutions from the community and/or the owners and support staff associated with the forum.

One technique traditionally technique for users to receive results or responses to a posted message, problem, or question required the user to make positive contact such as by continually checking back to the forum to view any answers or replies. Further, in traditional forums, other users accessing a posting may have the same or similar problems. However these users have not been able to easily indicate they are experiencing the same issue as described in a particular post. For instance, until the users made an individual posting there was no record that the user was experiencing a problem addressed in another users post. Thus, even though many users may have the same problem as described in particular posting, these users may be forced to submit another post to be tracked and/or to manually navigate back to a particular post to know when there are any related results.

Thus, it may be time consuming and inefficient for users to get results using traditional community forums. Further, it may be difficult for the owner or manager of a forum to determine which users have common problems, which problems occur most frequently, and to provide a response efficiently to a plurality of user having the same problems.

SUMMARY

A community driven prioritization of customer issues is described. In an implementation, a user interface providing interaction with a community forum is formed having at least one selectable portion corresponding to a posting, which when selected indicates agreement with the posting and associates a user with the posting. The user may then automatically be provided notification of any results (e.g., answers, instructions, or feedback) generated in relation to the posting. In another implementation, a service gathers data describing associations between a plurality of users and postings based on selection of corresponding portions of a user interface which are selectable to cause association of a user with the respective posting. The data may then be analyzed by the service to produce results, to determine how many and which users are associated with a posting, and/or assign priority to the postings.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 5 is a flow diagram depicting a procedure in an exemplary implementation in which postings in a community forum are prioritized based upon association of users interacting with the community forum.

The same reference numbers are utilized in instances in the discussion to reference like structures and components.

DETAILED DESCRIPTION

Overview

Figure 1:
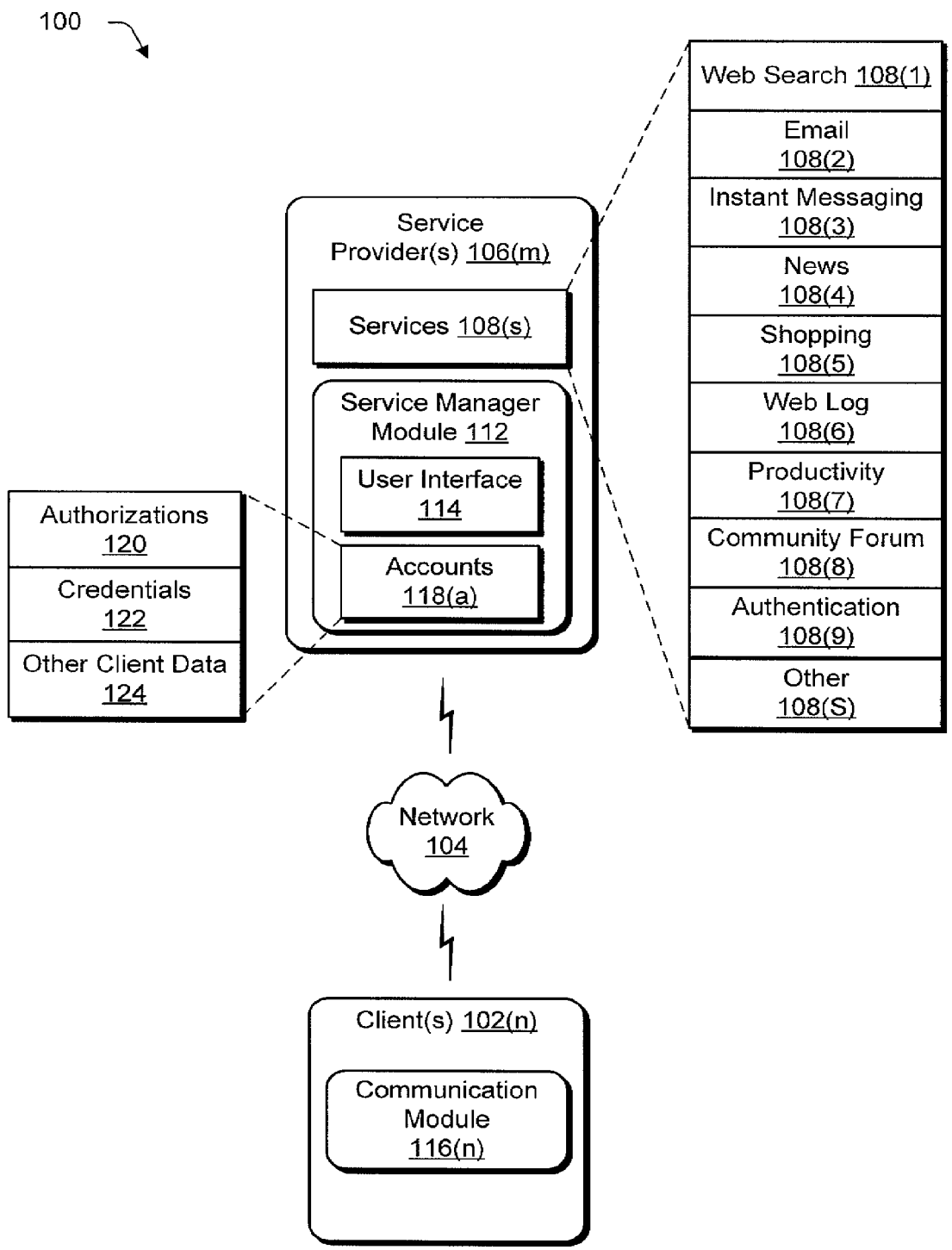
FIG. 1 is an illustration of an environment in an exemplary implementation that is operable to employ techniques for community driven prioritization of customer issues.

Forums are used for community based support of technical problems, to answer everyday questions, for discussion threads and so forth. In the course of a network based thread in a community forum, a variety of users may discuss problems, questions, thoughts, feelings, and so forth for numerous topics. Traditionally, users having similarity with or agreeing with a posting they are viewing have not been able to easily express that they agree with a particular posting, that they have the same problem, would like to associate with the posting, and so forth. Further, owners or managers of a forum have not been able to efficiently track which users have similar posts or problems, which issues or problems are most frequent, or to easily provide results to users having common issues or problems Accordingly, techniques for community driven prioritization of customer issues are described in which, a selectable portion is provided along with one or more posting in a community forum. Selection of the portion may cause the selector (client, user and/or account) to be associated with the corresponding posting. The portion may include an identifying prompt such as "agree", "me too", "associate" and so on. Thus, a user by selecting the portion indicates of agreement with the content of the corresponding posting, such as having the same question, issue or problem, agreeing with the posting, or otherwise indicating similarity or association with the posted message.

Further, by selecting the portion users are automatically associated with a posting and designated (e.g., signed-up, or subscribed) to receive results, feedback, and/or updates which may subsequently be generated for the posting. The association may occur based on authentication of the user to a corresponding account and without additional user input other than selection of the "agree" portion of the user interface. For instance, access to the forum may involve authentication of the client and/or user. Thus, the identity of the client/user may be known to the service providing the forum and when the portion is selected, the client/user may be associated with the posting based upon authentication data such as an account id, username, email address, and so forth.

A service may then reference stored associations of users with postings to provide notification of results (e.g., instructions, answers, and so forth) to each of the associated users when the results are generated in response to a posting. Notification may occur in a variety of ways such as via email, instant messaging, voicemail, desktop alerts ("toast"), as well as other suitable modes of communications.

In an implementation, data collected by a service from numerous clients and/or users is utilized to assign priority to postings (or to issues described by the postings) in a community forum. In an implementation, selection of a portion provided with a posting causes the association of a user to the posting to be stored (e.g., store user identity matched to the posting) and also updates or increments a counter related to the posting. Thus, the service may determine from the stored data how many and which users/clients have associated with a posting, and may assign a priority accordingly. Based upon the priority, technical support staff may determine or be alerted regarding the order in which to respond or produce results related to postings.

In the following discussion, an exemplary environment is first described that is operable to techniques for community driven prioritization of customer issues previously described, as well as other techniques. Exemplary procedures are then described which may be employed by the exemplary environment, as well as in other environments.

Exemplary Environment

FIG. 1 is an illustration of an environment 100 in an exemplary implementation that is operable to employ techniques for community driven prioritization of customer issues. The illustrated environment 100 includes one or more clients 102(n) (where "n" can be any integer from one to "N") communicatively coupled over a network 104 to one or more service providers 106(m) (where "m" can be any integer from one to "M").

The clients 102(n) may be configured in a variety of ways for accessing the service provider 106(m) and resources provided by the service providers over the network 104. For example, one or more of the clients 102(n) may be configured as a computing device, such as a desktop computer, a mobile station, an entertainment appliance, a set-top box communicatively coupled to a display device, a wireless phone, a game console, and so forth. Thus, the clients 102(n) may range from full resource devices with substantial memory and processor resources (e.g., personal computers, game consoles) to low-resource devices with limited memory, processing and/or display resources (e.g., traditional set-top boxes, hand-held game consoles, wireless phones). For purposes of the following discussion, the clients 102(n) may also relate to a person and/or entity that operate the clients. In other words, one or more of the clients 102(n) may describe logical clients that include users, software, and/or devices.

Although the network 104 is illustrated as the Internet, the network may assume a wide variety of configurations. For example, the network 106 may include a wide area network (WAN), a local area network (LAN), a wireless network, a public telephone network, an intranet, and so on. Further, although a single network 104 is shown, the network 104 may be configured to include multiple networks.

The service providers 106(m) are each illustrated as having a plurality of services 108(s) (where "s" can be any integer from one to "S") that are accessible via the network 104. The services 108(s) may be configured in a variety of ways to provide functionality over the network 104 to the clients 102(n). For example, the services 108(s) may be configured for access via platform-independent protocols and standards to exchange data over the network 104. The services 108(s), for instance, may be provided via an Internet-hosted module that is accessed via standardized network protocols, such as a simple object access protocol (SOAP) over hypertext transfer protocol (HTTP), extensible markup language (XML), and so on, further discussion of which may be found in relation to FIG. 2.

A wide functionality may be made available via the plurality of services 108(s). For example, a web search 108(1) service (e.g., a search engine) may be provided to search the Internet, an email 108(2) service may be provided to send and receive email, and an instant messaging 108(3) service may be provided to provide instant messaging between the clients 102(n). Additional examples include a news 108(4) service, a shopping (e.g., "ecommerce") 108(5) service, and a web log 108(6) service. Further, productivity 108(7) services may also be provided, such as word processing, spreadsheets, presentations, drawings, note-taking, and so on. For instance, network access may be given to the client 102(n) to applications that were traditionally executed locally on the client 102(n) itself. Therefore, execution of the application modules may be performed remotely at the service provider 106(m) and results of the execution may be communicated over the network 104 to the client 102(n).

A community forum 108(8) service may also be provided to permit clients 102(n) to engage in a variety of interactions with a community forum (e.g., message board, discussion thread and the like). Clients 102(n) make new postings (e.g., questions and comments) to the forum seeking feedback from other members or users of the community forum. The postings are exposed to the community via the service 108(8) such that a plurality of clients 102(n) may interact with the posting including searching and viewing postings of other clients in the community, reply to postings, obtain answers or feedback on the postings and so forth. Postings may also be categorized according to a wide range of topics and a particular forum may be arranged to include one or more topics, such as sports, computers, health, finance In accordance, with techniques describe herein a user interface formed to provide the interactions with the community forum may include a selectable control associated with and/or adjacent to one or more posting, which is selectable to associate a client 102(n) with the posting and to express agreement with the posting, further discussion of which may be found in relation to FIGS. 2-9 below.

An authentication service 108(9) may also be provided to authenticate clients 102(n) to access other services, which may include other services provided by the service provider 102(m) as well as other services provided by other service providers. While depicted as incorporated with a service provider 106(m), authentication service 108(9) and/or services 108(s) may also be provided as stand-alone services, further discussion of which may be found in relation to FIG. 2. Although a few examples of services have been described, it should be apparent that a wide variety of other services are also contemplated. Further, service providers 106(m) may range from those providing a single one of services 108(s) up to including an entire suite of services 108(s).

The service provider 106(m) is also illustrated as having a service manager module 112, which is representative of functionality used by the service provider 106(m) to manage access to the services 108(s) over the network 104, performance of the services 108(s), and so on. Although illustrated separately, the functionality represented by the service manager module 112 may be incorporated within the services 108(s) themselves. The service manager module 112, for instance, may be utilized to generate a user interface 114 that is provided over the network 104 to the client 102(n) to enable the client 102(n) to interact with the services 108(s). For example, the user interface 114 may be output through use of a communication module 116(n) that is executable on the client 102(n) to render the user interface 114, and more particularly data used to form the user interface.

Additionally, the service manager module 112 may manage a plurality of accounts 118(a) (where "a" can be any integer from one to "A"), each of which represents data that is utilized for interaction by the clients 102(n) with the plurality of service 108(s). For example, the account 118(a) may correspond to a particular client 102(n) and include authorizations 120 which indicate services 108(s) with which the client 102(n) is permitted to interact. The account 118(a) may also include authentication credentials 122 such as account identifiers, username, passwords and so forth used to authenticate the client's 102(n) identity. A wide variety of other client data 124 is also contemplated, such as account preferences, user profiles, settings, and so on.

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, further description of which may be found in relation to FIG. 2. The features of techniques for community driven prioritization of customer issues described below are platform-independent, meaning that the techniques may be implemented on a variety of commercial computing platforms having a variety of processors.

Figure 2:
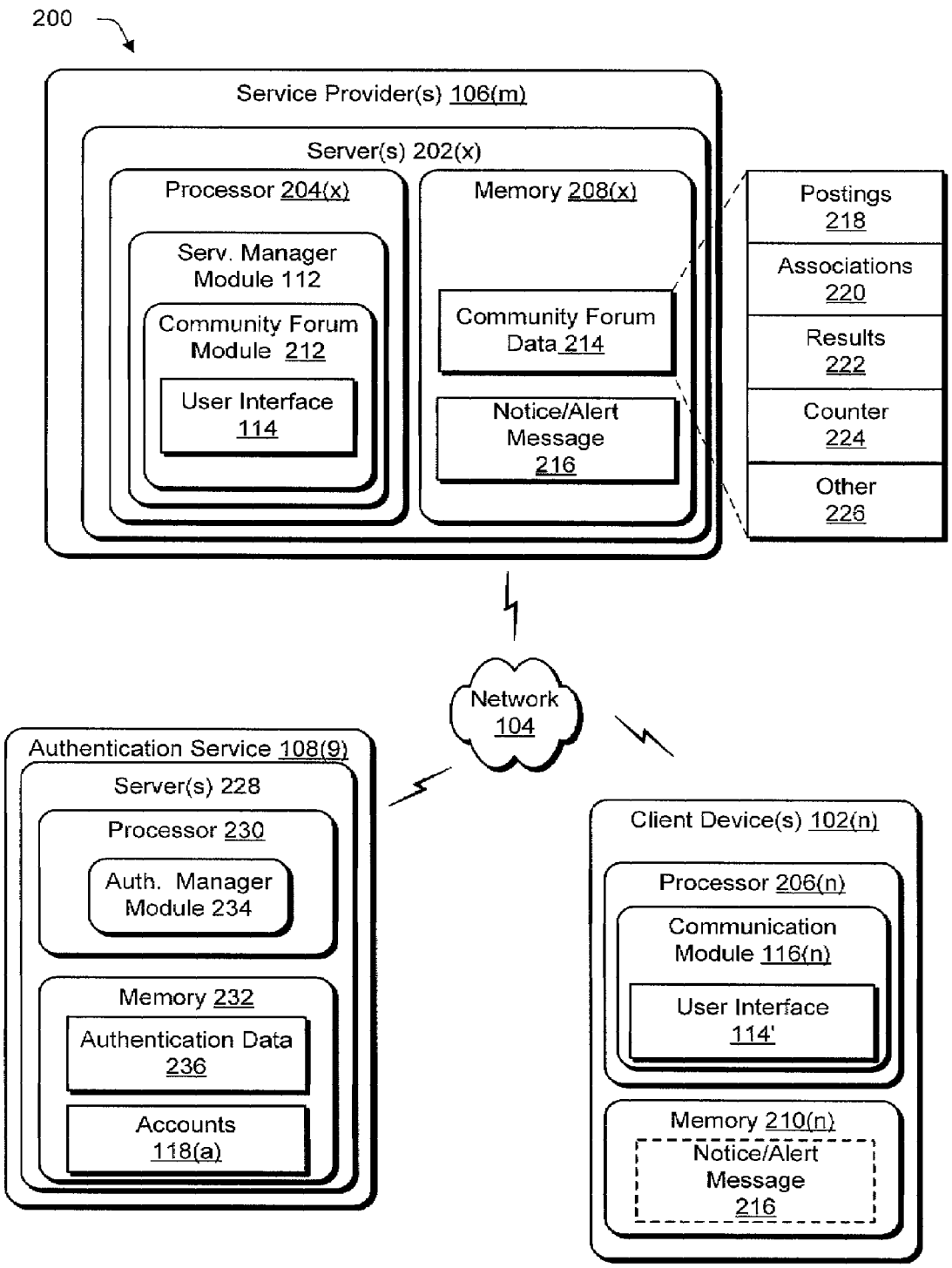
FIG. 2 is an illustration of a system in an exemplary implementation showing a service provider and client of FIG. 1 in greater detail.

FIG. 2 is an illustration of a system 200 in an exemplary implementation showing the service provider 106(m) and the client 102(n) in greater detail. In FIG. 2, the service provider 106(m) is illustrated as being implemented by one or more servers 202(x) (where "x" can be any integer from one to "X") and the client 102(n) is illustrated as a client device.

The server 202(x) and the client 102(n) each include a respective processor 204(x), 206(n) and respective memory 208(x), 210(n). Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 208(x), 210(n) is shown, respectively, for the server 202(x) and the client 102(n), a wide variety of types and combinations of memory may be employed, such as random access memory (RAM), hard disk memory, removable medium memory, and so forth.

As previously described, the services 108(s) of FIG. 1 may be configured in a variety of ways to provide functionality over the network 104 to the client 102(n). For example, the services 108(s) may be provided via the service manager module 112 and/or one or more sub modules associated with one or more of the services 108(s) which may be configured as Internet-hosted modules accessed via standardized network protocols.

For example, in FIG. 2 the service provider 106(m) is configured to provide at least a community forum service 108(8). Accordingly, service manager module 112 is depicted as including a community forum 212 module which represent functionality to provide the community forum service 108(8) to clients 102(n) via the network 104. Both the service manager 112 and community forum 212 modules are illustrated as being executed on the processor 204(x) and are storable in memory 208(x). Community forum module 212 may also be provided as a stand-alone module separate from the service manager module 112.

The community forum module 212 when executed, further represents functionality, to manage a variety of community forum data 214, access to and interactions with the community forum data 214, analysis and results of the data, associations based on the data, and so forth. In addition, the community forum module may be configured to form a variety of notice and/or alert messages 216, based upon the community forum data 214, which may be communicated to recipients such as clients 102(n), users, accounts 118(a), forum owners or managers, and so forth via the network 104. Notice/alert messages 216 are depicted as storable in memory 208(x). Users may receive the notice/alert messages 216 via one or more clients 102(n) configured to receive, access, and/or download the notices via network 104 as represented by notice/alert message 216 depicted in phantom in memory 210(n) of client 102(n).

The community forum data 214 is depicted as storable in memory 208(x) of server 202(x) and may include a variety of postings 218 from clients 102(n) such as questions, comments, and so forth; associations 220 which describe relationships between and/or match clients 102(n) and the postings 218; results 222 such as answers, instructions, and so forth which may be generated in relation to postings 218; counters 224 which keep track of how many clients 102(n) are associated with corresponding postings; and various other 226 community forum data such as replies to postings, community ratings for postings and/or results, priority data associated with postings, topics and/or categorization data for postings, and so on. Notice/alert messages 216 may be configured in a variety of ways and sent by a variety of communication modes to communicate results 222, priority data associated with postings, and/or other notice, reports, and alerts generated based on analysis of community forum data 214, to one or more designated recipient or group of recipients, further discussion of which may be found in the discussion of FIGS. 3-9.

In FIG. 2, community forum module 212 is further illustrated as forming a user interface 114 which is configured to provide interactions with community forum data 214 to clients 102(n) via network 104. Community forum module 212 may provide data sufficient to form a user interface 114. This data may be communicated over the network 104 to the client 102(n) and used by the communication module 116(n) which is illustrated as being executed on the processor 206(n) and is storable in memory 210(n)) to output user interface 114'.

Interactions provided via a user interface 114 may include inputting new posts 218, updating the data 214, searching the data 214, replying to postings 218, forming associations 220 with postings, and so on. In one or more implementation associations 220 are formed upon a selection of a portion in user interface 114 corresponding to a posting 218 and selectable to cause formation and storage of the association between the selector (client/user) and the posting. The user interface 114' may be configured in a variety of ways to provide this interaction, further discussion of which may be found in relation to the following figure.

As previously discussed, a service may also be provided as a stand-alone service. For example, an authentication service 108(9) is depicted in FIG. 2 as a stand alone service provided by a server 228 configured for network 104 access and that has a processor 230 and memory 232. The authentication service 108(9) includes an authentication manager module 234 that is executable on the processor 230 to authenticate the client 102(n) using authentication data 236. For instance, the client 104(n) may provide a name and password which is authenticated by the authentication service module 224 using the authentication data 236. When the authentication is successful (i.e., the client 102(n) "is who they say they are"), the authentication manger module 234 may pass a token to the client 102(n) that is used by the client 102(n) to access services 108(s) of the service provider 106(m). The token may also be used to access other services by other service providers such that the client 102(n) is not forced to re-authenticate to access each of the plurality of service providers 106(m). Authentication service 108(9) may also be configured to manage the accounts 118(a) corresponding to one or more service providers 106(m). Thus, using a stand alone authentication service 108(9), the authentication and account management functionality may be offloaded from the service providers 106(m) and one authentication service 108(8) may provide this functionality concurrently to many service providers 106(m). A variety of other examples are also contemplated.

Figure 3:
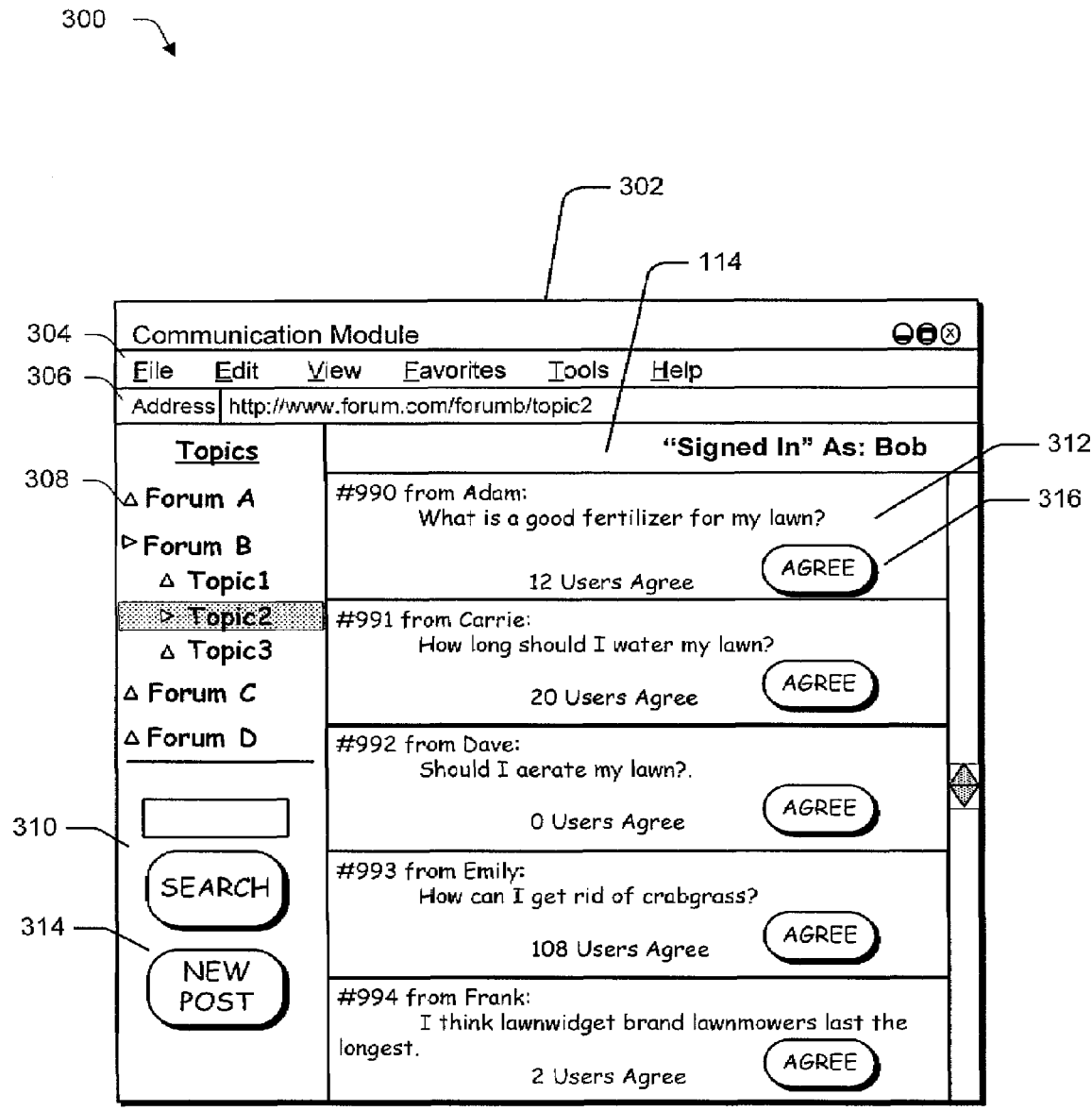
FIG. 3 is an illustration of an exemplary implementation showing a user interface of FIG. 2 in greater detail.

FIG. 3 illustrates an exemplary implementation 300 showing the user interface 114 of FIG. 2 in greater detail. The user interface 114 provided by the service provider 106(m) in this instance is illustrated as incorporated within a user interface 302 provided by the communication module 116(n). For example, the communication module 116(n) may be configured as a browser that includes a menu bar 304 and an address bar 306. The menu bar 304 is a portion of the user interface 302 that includes drop-down menus of commands, examples of which are illustrated as "file", "edit", "favorites", "tools" and "help". The address bar 306 is configured to receive inputs to navigate to particular network addresses and/or display current network addresses, from which, the client 102(n) has received content and is being displayed. Other communication modules 116(n) such as instant messaging, email, and so forth are also contemplated.

The user interface 302 also includes a user interface 114 formed from data obtained via the network 104 from the service provider 106(m) and which provides interactions with a community forum, e.g., interaction with community forum data 214. The user interface 114 formed from the service provider 106(m) data includes a topic portion 308 that includes representations of different topics or separate forums (e.g. categories) which a clients 102(n) may interact with. For instance, topic region is illustrated as listing topics available from the service provider 102(m), examples of which are illustrated as "Forum A", "Forum B", "Forum C", "Forum D" each of which may have subcategories or topics such as Topic 1, Topic 2 and Topic 3 listed under "Forum B". Thus, topic portion 308 may provide functionality to navigate to particular forums, topics, and postings and so forth in the community forum.

A community forum may be arranged for community discussions regarding one or more of a wide variety of topics such as home improvement, news, sports, finance, politics, shopping, consumer protection, computers, technology, and so forth. In FIG. 3, the user interface is illustrated as navigated to "Topic 2" which may correspond to discussion related to lawn care. Naturally, numerous topics and sub topics may be employed with the described techniques without departing from the spirit and scope thereof.

In one or more implementation, a community forum is arranged as a technical support forum to provide support for technical problems associated with a product and/or service. In one implementation a community forum is provided for support of computing device related software and hardware products, such as personal computers and/or computing devices such as handheld device, phones, laptops, desktop computers, servers, and so forth. In this arrangement, in addition to support from the community of users replying to posting, the owner or manager of the forum (e.g., technical support staff or designee) may utilize the forum to disseminate feedback (e.g. answers, instructions, results) which are configured to address or troubleshoot problems or issues with software (for example, application modules), hardware (e.g. computing devices), settings and configurations and so forth which are described in postings. Further discussion of community forum configured to support products and service such as computing device related software and hardware products may be found in relation to FIG. 7.

The user interface 114 formed from data obtained from the service provider 106(m) also includes a search portion 310 that is operable to receive characters (e.g., text) input by a user to perform a search, such as searching community forum data 214 for particular topics and/or postings 218. Items found as a result of the search may then be displayed elsewhere in the user interface 114. For instance, the illustrated user interface 114 includes a postings portion 312 for displaying postings 218 input by clients 102(n) to the community forum. The displayed postings 218 may be the results of navigating via topics portion 308 or searching via search portion 310. The community forum service 108(8) also provide functionality for making new posting 218 which may be accessed via a selectable new post portion 314.

The postings portion 312 as illustrated in FIG. 3 may display a plurality of postings 218, which may be related under a particular topic, for example in the "lawn care" in the depicted case. A viewer may then interact with the postings 218, such as reading, responding and so forth. In certain cases, and in particular when a problem, issue, or question is described in a posting 218, the viewer may experience the same or similar problem or have the same question. The viewer may accordingly wish to express this agreement and to be associated with the posting 218 such that they are notified of results (answers, feedback or instructions) provided in response to the posting, in particular from technical support staff or designees. Further, the service provider 106(m) and/or forum owner may wish to know how many and which user are experiencing particular problems or issues, so that the most pressing issues may be resolved and feedback provided to the users.

Accordingly, to implement community driven prioritization of customer issues, an agree portion 316 associated with one or more posting 218 may be provided in a user interface 114 configured for interactions with a community forum. The agree portion 316 may be selected by a user to express agreement with the posting and or to cause an association between the user and the posting to be communicated to the service provider 106(m) and/or forum owner. Agreement with the posting as used herein may mean that the user has the same problem or question, agrees with a statement made in the posting, or otherwise wishes to express similarity or association with the posting. While the agree portion 316 is depicted as having the prompt "Agree" an variety of other prompts are contemplated such as "associate", "me too", "same issue" and so forth.

Further discussion of utilizing agrees portions of a user interface configured for interaction with a community forum to associate users with postings in the community forum may be found in relation to the following figures.

Exemplary Procedures

The following discussion describes techniques for community driven prioritization of customer issues that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2.

Figure 4:
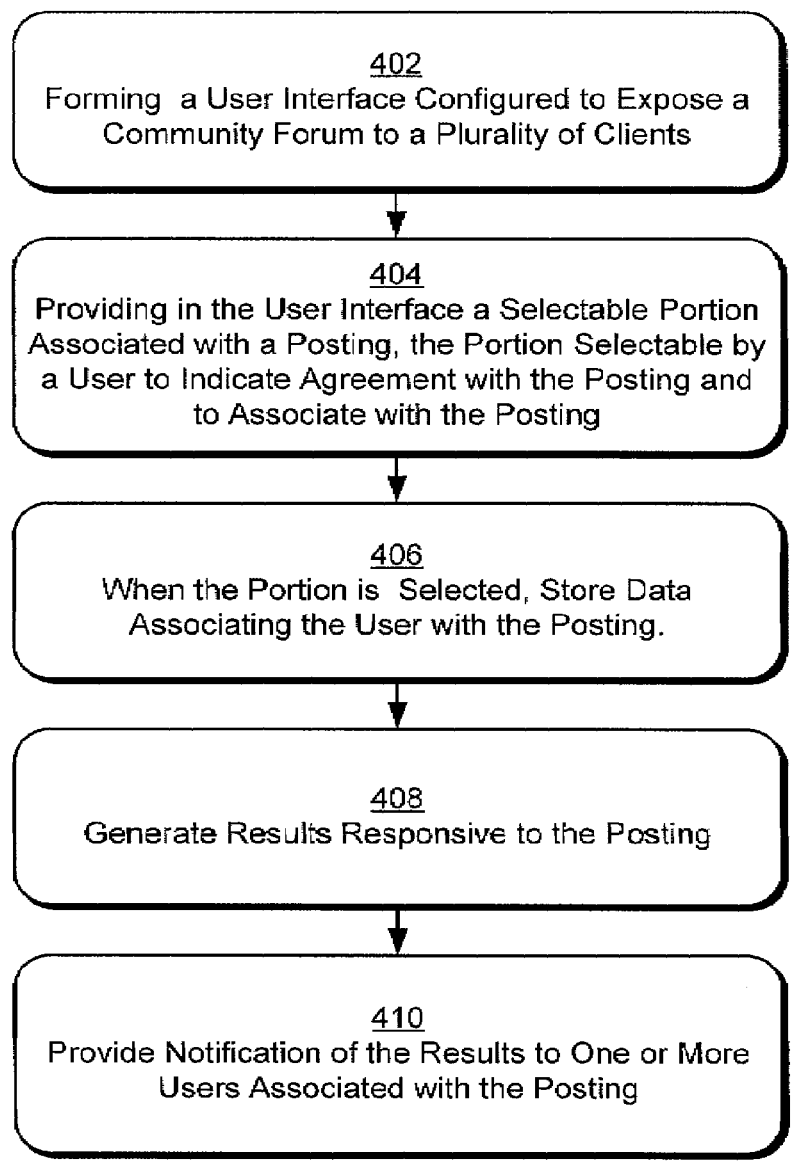
FIG. 4 is a flow diagram depicting a procedure in an exemplary implementation in which a provider of a community forum stores data associating users with postings in the community forum and provides notification of results based on the associations.

FIG. 4 depicts a procedure 400 in an exemplary implementation in which a provider of a community forum stores data associating users with postings in the community forum and provides notification of results based on the associations. During the discussion of the procedure 400 of FIG. 4, reference will also be made to an exemplary implementation 300 of a user interface shown in FIG. 3.

A user interface is formed which is configured to expose a community forum to a plurality of clients. (block 402). For example, the client 102(n) may execute a communication module 116(n) configured as a browser and navigate over the network 104 to a network address of the service provider 106(m). The client 102(n) may also provide authentication information, such as name and password, to authenticate the client's 102(n) identity. The service provider 106(m) and in particular community forum module 212 may be executed to provide community forum service 108(8) including formation of an interface 114 for interactions with the community forum. In particular the interface may be utilized to expose community forum data 214 to a plurality of clients 102(n) via network 104. The client 104(n) may then receive data that is used to form a user interface 114 and output the interface via communication module 116(n) to interact with the community forum, such as to view a variety of postings 218 of the forum.

A selectable portion is provided in the user interface associated with a posted message which is selectable by a user to indicate agreement with the posting and to associate with the posting. For example, the user interface 114 of FIG. 3 includes agree portions 316 which may be associated with one or more postings 218 displayed in the postings portion 312. In FIG. 3 the agree portions 316 are arranged adjacent to a corresponding posting, however a variety of other arrangements may also be employed. A user "Bob" via communication module 116(n) of a client 102(n) configured as browser may navigate to the displayed postings via interface 114 which is incorporated in the user interface 302 of the browser. "Bob" may read the first listed posting (#990) which describes a question from "Adam" asking for suggestions on lawn fertilizer. "Bob" may have the same or similar question and accordingly may select the adjacent agree portion 316 to express agreement (e.g., "I have the same question") and to associate with the posting.

Upon selection of the portion corresponding to a posting, data is stored to associate the user with the posting (block 406). For instance, when "Bob" selects the agree portion 316 corresponding to posting #990 in the previous example, the communication module 116(n) of client 102(n) may respond by communicating data to the service provider 106(m) to associate "Bob" with the posting. The community forum module 212 may receive the data and utilize the data to from and store an association 220 matching "Bob" and posting #990 as community forum data 214.

"Bob" for instance may be "signed in" to an account 118(a) managed by the service provider 106(m) or authentication service 108(9). Thus, the service provider 106(m) may know the identity of "Bob" and the corresponding account 118(a). Thus, authentication data 236 and/or account data corresponding to "Bob" and the account 118(a) may be utilized to associate Bob and/or the account 118(a) with the posting 218. For instance an identifier of the user, or an account 118(a) such as a user id, account id, credentials (username and password), authentication token, tickets, or other client data such as an email address, instant messaging contact, and so forth may be obtained based on the account 118(a) used by "Bob" and provided to the service provider 106(m) to associate "Bob" with the posting. The association may then be used by the service provider 106(m) to contact "Bob", e.g. to notify "Bob" in reference to the posting 218, e.g. to send an notice/alert message 216 indicating or including results 222 for the positing 218 to "Bob" or the corresponding account 118(a) The association of "Bob" with the posting 218 occurs upon selection of the portion 316 and without "Bob" inputting additional data, e.g., automatically and without user input of credentials, personal information (contact data), or the like.

Further, selection of the agree portion 316 indicates and is interpreted as an expression by "Bob" that he agrees with the posting. Thus, in addition to storing the association 220 the community forum module 212 may be configured to record "Bob's" agreement such as by updating or incrementing a counter field 224 configured to track the number of users agreeing with a posting, having the same problem described in a posting, and so forth. Thus, for Bob's selection of the agree portion 316 may be accounted for by a counter 224 associated with the corresponding posting.

Results responsive to the posting are generated (block 408). For instance, service provider 106(m) may compile data from a plurality of clients 102(n) associating users with postings 218. The data may be used to determine priority of issues or questions based on the associations made by user of the community forum, further discussion of which may be found in relation to FIG. 5 below. Results 222, such as answers to questions, instructions for addressing a problem, comments, notes, and so on may be generated by the service provider 106(m).

These results for instance may be produced by a technical support staff, which may include one or more designated super users or community experts, enlisted to provide results, forum owners or mangers, service providers, product teams, customer support, and so on. Results 222 refer to answers and so forth generated by the service provider 106(m), owner of the forum, or a designee such as enlisted super user or experts as distinguished from replies posted in the forum from the general community. Thus, the results 222 are backed by some level of authority from the provider of the forum. In the previous example, one or more expert on lawn care may be enlisted by service provider 106(m) to review the postings and to produce results 222, which may be input via community forum module 212 as community forum data 214. As an example results in response to posting #990 may be a recommended brand or type of fertilizer or other instructions related to a posted question. The results 222 may be disseminated to users via the community forum, such as by updating the display of user interface 114 to include the results or a link to the result along with the posting 218 in the postings portion 312.

Notification of results are provided to one or more users associated with the posting (block 408). For instance, community forum module 212 of service provider 106(m) may be configured to form a notification (e.g., notice/alert message 216) for communication to clients 102(n), users and/or accounts 118(a) associated with a posting for which results 222 have been generated. The community forum module 212 may reference associations 220 stored as community forum data 214 to determine which clients 102(n), users and/or accounts 118(a) are provided the notification. Thus, notification of results 222 may be provided to a plurality of users via network 104, who through use of interface 114 and a selectable agree portion 316 have been associated with a posting 218 corresponding to the results.

The notification of results may be communicated in a variety of ways, for instance via email, instant messaging, pager, voicemail, text messages, or other suitable communication modes and/or alert messages sent to associated users and/or accounts 118(a) of the users. In an implementation, client data 124 associated with a user and account 118(a) may specify one or more preferred modes of communication for receiving the notification of results 222. These preferred modes may be included in or referenced based upon the associations 220 stored by the service provider 106(m). Thus, community forum module 212 may further be configured to provide notification to different associated users via different modes of communication, based upon specified preferences of the users.

The notification may indicate that results 222 for a posting 218 that the user has associated with are available, such as indicating that the results have been posted in the community forum. Notification may also be configured with a selectable alert message or portion such as hypertext in an email, a selectable desktop pop-up message ("toast") from a communication module 116(n) executing on a client 102(n), a selectable button or control, and so forth. Thus, the notification may provide an option selectable to navigate to the results 222 for a corresponding posting 218. In one or more implementation, the results 222 may be provided directly in the notification in addition to or in lieu of indicating the results 222 have been posted in the community forum with the original posting 218.

FIG. 5 depicts a procedure 500 in an exemplary implementation in which associations of users with postings in a community forum are utilized to assign priority to the postings. Based on the priority, the highest priority issues may be identified and/or surfaced to technical support staff, service managers, or designated super users or experts. During the discussion of the procedure 500 of FIG. 5, reference will also be made to an exemplary implementation 600 of a user interface shown in FIG. 6.

Figure 6:
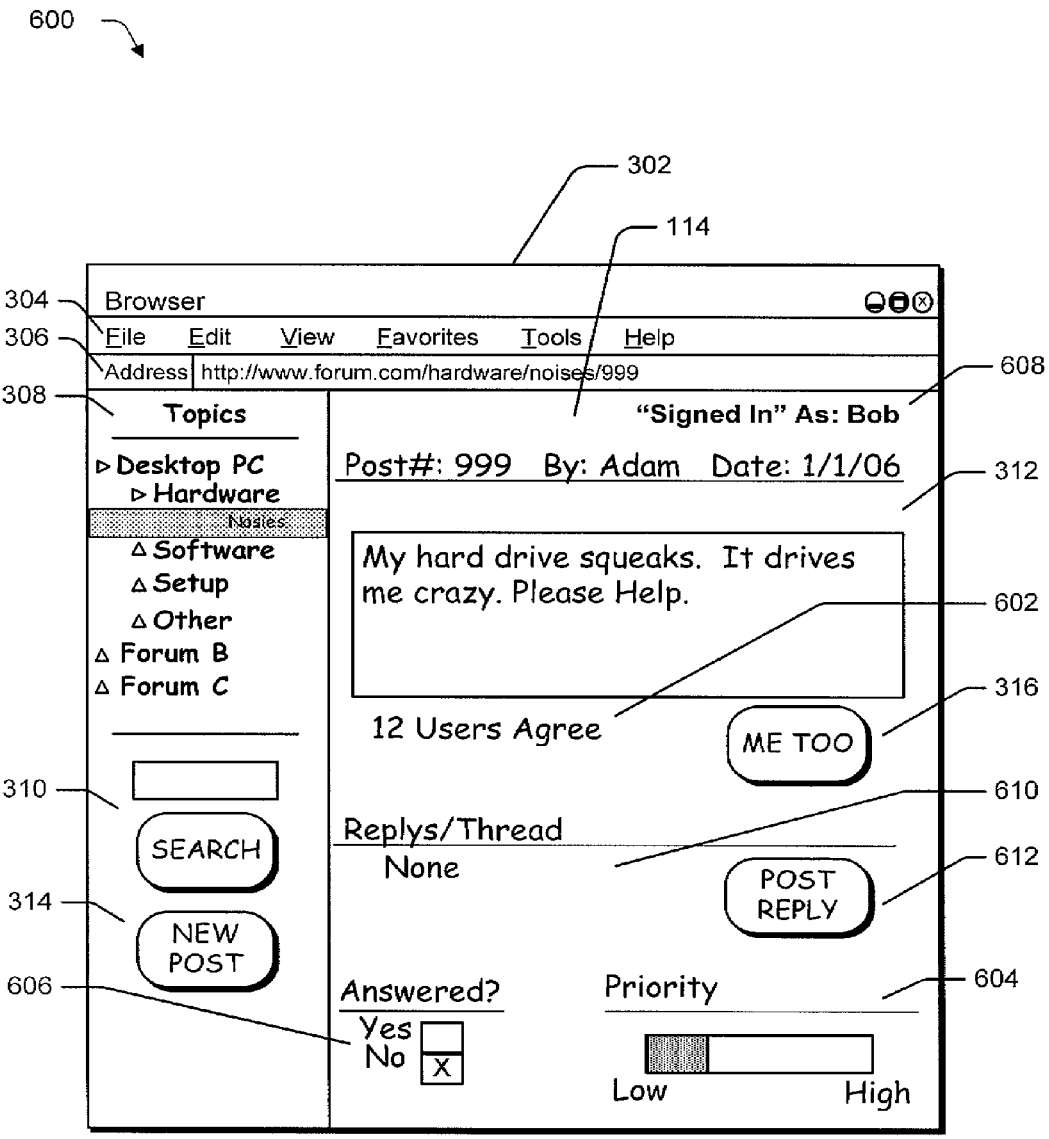
FIG. 6 is an illustration of an exemplary user interface that is operable to obtain data to store associations of users with postings in a community forum as described in the procedure of FIG. 5.

One or more selectable portions are provided in a user interface configured for interaction of a plurality of the clients with a community forum, wherein each selectable portion corresponds to a posting and is selectable by a user to indicate agreement with the posting and to associate with the posting (block 502). For example, the community forum module 212 of a service 106(m) may form a user interface 114, which is communicated via network 104 to a plurality of clients 102(n). Respective communication modules 116(n) of clients 102(n) may output the interface 114 incorporated within another interface, such as implementation 300 of user interface 302 for a browser depicted in FIG. 3. Thus clients 102(n) may provide interactions with community forum data 214 maintained by the service 106(m) via the interface 302 which includes interface 114. The interface 114 includes region 312 for display of a plurality of postings 218 and provides a selectable agree portion 316 adjacent to each of the postings 218. Referring to FIG. 6, another implementation 600 of user interface 302 which may be output by a communication module 116(n) of a client 102(n) is depicted, and which includes the interface 114 for interactions with the community forum. Implementation 600 also includes the region 312 for display of at least one posting 218 and provides a selectable portion 316 adjacent to the postings 218. In this case the agree portion 316 is illustrated as having the title or prompt "Me Too" as an alternative to the prompt "Agree" in FIG. 3.

As described previously with respect to FIG. 3, the agree portions 316 in both FIG. 3 or FIG. 6 are selectable by a user of client 102(n) to indicate agreement with the corresponding posting (e.g., has the same question, agrees, and so forth) and to associate with the posting. For instance, selection of a agree portion 316 may cause communication of data via network 104 from a client 102(n) to service 106(m), which may include an account id, email address, contact information, authentication token or data, or other suitable identifying data corresponding to the client 102(n) or user of the client, and which may be utilized by the service 106(m) to associate the user with the corresponding posting 218. Based on the association via the selectable portions 316, answers or responses to a posting 218 may be communicated to associated users.

The service 106(m) may then store a plurality of associations of users with postings in a community forum responsive to communication of user selections of the portions from one or more clients (block 504). For instance community forum module 212 may receive communication of user's selections of portions 316 via network. The communications contain data sufficient to associate the senders (e.g., client, user, account) with a postings 218 corresponding to the selected portions. For instance, the communication may include the identification of the posting 218 (a posting id, number and so forth) along with data identifying the user, an account of the users and so forth. Thus, community forum module 212 may form associations 220 matching users (or clients) to postings 218, in response to communications of selections from a plurality of clients which are stored as community forum data 214 in memory 208(x) of sever 202(x) at the service provider 106(m). Further, community forum module 212 updates counters 224 corresponding to the postings 218 to track the number of associations 220 of users with corresponding postings 218. Thus, the service 106(m) may determine and track how many and which users and/or clients 102(n) are associated with postings 218 based on selection of portions 316 in a user interface.

Then, priority for one or more postings is determined based at least in part on the associations (block 506). For instance, the associations 220 and counters 224 may be analyzed or processed to determine which postings are most important. In an implementation priority reflects the number of associations 220, thus a posting 218 with 100 associations may have a higher priority than another posting with only 12 associations.

In other cases the counters 224 may be used along with other factors and user data to determine priority. For instance, counters 224 may indicate the number of associations 220, and the associations may include or reference additional client (or user) data 124, such as accounts 118(*a*), user profiles and the like which may be accessed and analyzed to determine priority. A variety of data may be included in the determination of priority, such as which users are associated, the type of users (business, home, and so forth), the number of associations (counters), a weight factor assigned to a particular forum or topic, and/or other weighted factors such as locations, types of client, timing, product types, and so on. For instance, if 100 business users are associated with a posting 218 describing a virus problem with a critical application a relatively high priority may be determined. However if 10 home users are associated with a posting asking a question regarding templates for a word processor, the priority may be lower. A variety of other examples are contemplated.

Based on the priority of the posting, an alert is formed for communication to recipients enlisted to respond to postings (block 508). For instance, based on the priority the community forum module 212 may form alerts or other messages (e.g., notice/alert messages 216) which are configured to be communicated to designated recipients or groups of recipients such that they are made aware of and may respond to the postings 218. Thus, based on a community of users association with postings 218, the most critical problems, questions, issues and so forth may be brought to the attention of those enlisted to provide results (e.g. answers, instructions, responses and so forth). The association data provided by selection of portions 316 is thus leveraged to prioritize responses to the corresponding postings 218.

An alert may be configured to be communicated via a variety of modes such as email, instant messaging, text message, voicemail, desktop alerts ("toast"), pagers, or other suitable communication to alert designated recipients of the priority associated with postings. The alerts may be generated for individual postings as priority changes, on a periodic basis for one or more posting, on demand and so forth. Further, the alerts may configured in a various was such as alerts for individual postings, as summary reports listing a group of postings and associated priorities (for example, a listing of active postings arranged by order of priority), a report summarizing or presenting a selection of the highest priority postings (for example, the top 10 or 100), and a variety other arrangement of priority data suitable for designated recipients to understand the priorities and to prioritize responses to respective postings.

Further threshold priority levels may be set to cause different sets of recipients to receive the alerts as the priority changes. For example, as priority of a posting 218 escalates, increasing levels of attention may be called to the postings, such as providing alerts to different set of recipients. Recipients may be arranged in a hierarchal chain which may for example include designated users or community experts, forum managers or owner, service providers, customer or technical support, product managers, and so forth. Thus, alerts may be provided to recipients or individuals with increasing levels of authority or control as the priority of posting increases.

For instance, referring again to FIG. 6, the forum in this implementation is directed to support of personal computers. Accordingly, the posting from "Adam" in portion 312 describes an issue with hardware "My hard drive squeaks. It drives me crazy. Please Help." The agree portion 316 is displayed and selectable such as by another user "Bob" to indicate he also has the squeaky hard drive and to associate with the posting. A variety of users and clients may indicate through selection of a agree portion 316 that they have the squeaky hard drive. Initially, responses to the posting may be in the form of replies posted from the general community of users accessing and interacting with the community forum. As priority increases, increasing levels of enlisted support staff (recipients) may be alerted (e.g. receive a notice/alert message 216 formed by the service provider 106(*m*)). When 20 people have the problem, the priority determined by community forum module 212 may reach a first threshold which may cause community forum module 212 to communicate an alert to a designated user or expert associated with the community forum. When 100 people have the problem or are associated with the post, another threshold may be reached and alerts may be communicate to a customer or technical support team. If 500 users are having the squeaky hard drive, the associated priority may again escalate and reach a threshold at which a managerial level such as a product manager or team receives an alert. Naturally, a variety of threshold levels may be set and matched or related to various groups of recipients, such that designated recipients are alerted when the corresponding threshold priority is met, in accordance with the described techniques While an alert to recipients and specifically, support staff is described it may be appreciated that a variety of other actions could be initiated in response to escalating priority such as, notifying users or clients 102(*n*) of the escalated priority, updating the user interface to reflect the escalating priority, forming a assistance ticket or record for an automated support system, generating reports, performing selective processing of data dependent on the priority (e.g., threshold priority causes additional data to be gathered and analyzed by the community forum module 212), and so forth. Thus, the described techniques are suited to surfacing issues raised in community forums to appropriate support personnel, such that the issues raised in postings may by resolved and results in the form of answers, feedback, instructions and so forth may be disseminated to those users associated with postings.

Referring again to FIG. 6 it is further noted, that the counters 224 and/or priorities corresponding to postings may be communicated to a client and/or presented to a user via a user interface 114. For instance, in FIG. 6 interface 114 is illustrated as including a number of additional features, which may be provided for interactions with a community forum. For instance, the interface 114 includes an indication 602 expressing the number of users who have selected the agree portion 316 for the post. In this case 12 users have agreed. The indication 602 corresponding to a posting may be generated based on an associated counter 224.

Additionally, a priority 604 portion is included to express the determined priority of the post. In this case the priority is represented as a status bar on a scale from Low to High. It may be appreciated that the priority may expressed in a variety of ways such as on a number scale (1 to 10), according to textual categories (high, med, low), on a color scale (green, yellow, red) and so forth. Naturally, the indication 602 and priority portion 604 may be updated as more or fewer users are associated with a posting 218.

Additional features illustrated in FIG. 6 may include a answered indication 606 to express whether the posting has associated results or answers, a current user portion 608 to indicate the currently authenticated user or account e.g., "Signed In As: Bob", and a portion 610 for displaying, linking to, or indicating replies posted by the community of users in response to the posting 218, as well as a post reply portion 612 which may be selected by as user to input a reply to the posting 218. In this instance, no replies are shown; however one or more replies could be represented in the portion 610 in fall, in summary form, as textual links providing access to the replies, and so forth.

Figure 7:
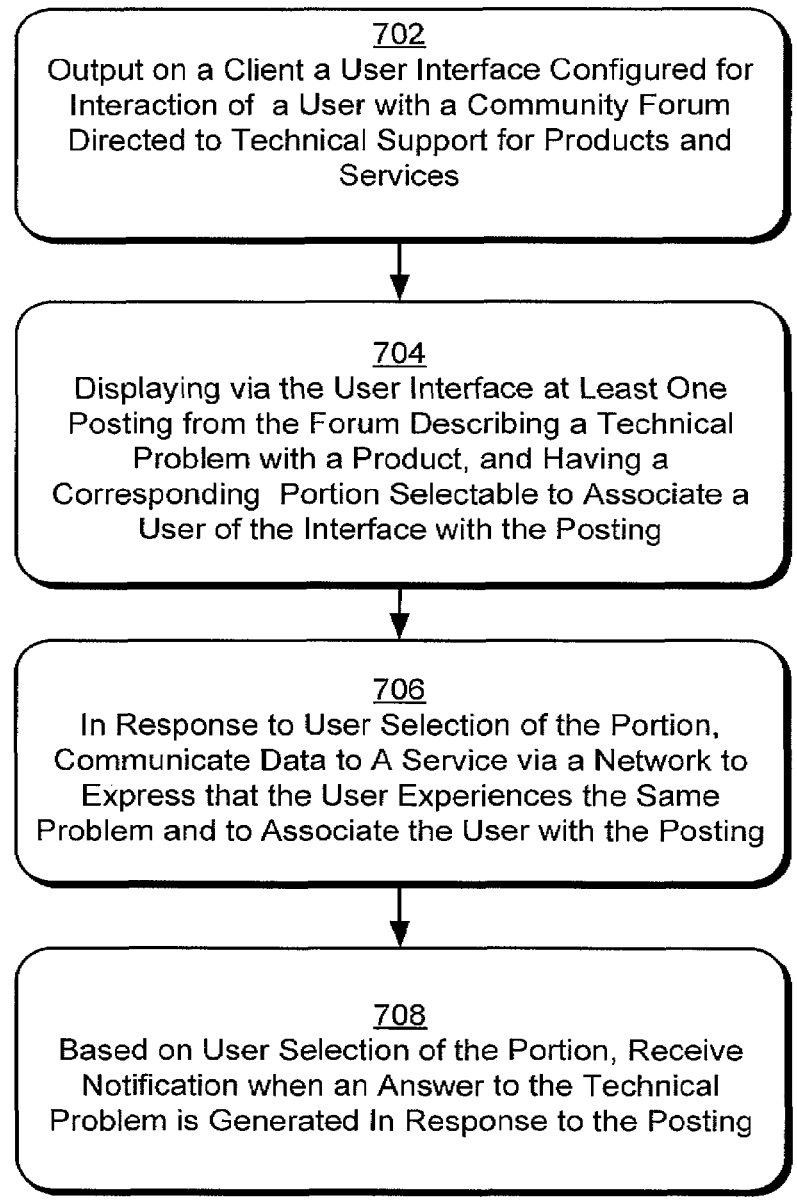
FIG. 7 is a flow diagram depicting a procedure in an exemplary implementation in which a client, in response to user selection of a portion of a user interface, communicates data to a service sufficient to associate the user with corresponding postings in a community forum.

FIG. 7 depicts a procedure 700 in which a client, in response to user selection of a portion of a user interface, communicates data to a service sufficient to associate the user with corresponding postings in a community forum, such that the notification of an answer to a technical problem described in a posting is received by the user. During the discussion of the procedure 700 of FIG. 7, reference will also be made to an exemplary implementation 800 of a user interface shown in FIG. 8.

A client outputs a user interface configured for interaction of a user with a community forum directed to technical support for products and services (block 702). For instance, client 102(n) may receive data sufficient to form implementation 800 of a user interface 302 of and output the user interface via communication module 116(n). In the implementation 800, the interface 114 incorporated within the communication module interface 302 (such as a browser) provides interaction with a forum configured for supporting personal computers. The personal computer support forum may be arranged for supporting one or more of computer hardware; computing devices; peripheral devices; software applications including operating software, application modules (such as application for business/office productivity, network management, computer performance and security, multimedia, graphic design, entertainment, software development, communications (e.g. email, instant messaging), internet interactions, database, and/or other client applications), programming interfaces and so forth; configurations and settings for personal computers or computing devices; hardware or software set-up support; purchasing support, and so on. Naturally, a forum could also be directed to a variety of other products and/or services.

The user interface displays at least one posting from the forum describing a technical problem with a product, and having a corresponding portion selectable to associate a user of the interface with the posting services (block 704). For instance the interface 114 of FIG. 8 includes a portion 802 displaying a posting #999 which is directed to a problem with a hard drive that squeaks. The portion 804 has an associated agree portion 316 which as previously described is selectable to associate a user of the interface with the posting #999. Interface 114 of FIG. 8 also includes the current user portion 608 indicating that "Bob" is signed-in to access and interact with the community forum.

In response to user selection of the portion, data is communicated to a service via a network to express that the user experiences the same problem and to associate the user with the posting (block 706). For instance when "Bob" selects the portion 316 in FIG. 8 communication module 116(n) may be configured to form a communication to the service provider 106(m). As noted, "Bob" is signed in to an account 118(a). In implementation, the account 118(a) may be used by "Bob" to access a variety of resources of one or more service providers 106(m) following authentication of credentials one time, e.g. a single sign-in. "Bob" may then use the authenticated account 118(a) to access the various associated resources without re-authenticating.

Additionally, the association of "Bob" with the posting #999 occurs without "Bob" reentering credentials, contact information, or so forth. Rather, communication module 116(n) and/or community forum module 212 understands the identity of "Bob" based on "Bob" already having signed-in. Thus, data sufficient to associate "Bob" with the posting may be obtained from data associated with Bob's account 118(a) such as an account id, email address, user profile, authentication data (credentials, tokens and so forth), and so forth. Communication may be formed to include additional information, such as the id of the posting, preferred communication modes, and so forth.

Alternatively, a communication from client 102(n) may identify the user and the service 106(m) may obtain any additional data associated with the user and or account 118(a) to form an association 220, or subsequently when an association 220 is used to provide results, set priority, and so forth. Thus, selection of the portion 316 by "Bob" is sufficient to cause the association, automatically and without further input from "Bob". Communication module 116(n) provides the communication to the service provider 106(m) via network 104 which responds by storing an association 220 between "Bob" and posting #999.

Based on user selection of the portion, the user receives notification of an answer to the technical problem generated in response to the posting (block 708). As noted, in response to "Bob's" selection, an association 220 is stored associating "Bob" with the hard drive problem. When an answer is generated, such as by support personal, a designated community expert, and so on, the association 220 may be referenced by the service provider to determine which users to notify. Since "Bob" has selected the portion 316 to associate with the problem, "Bob" will receive the notification. For instance, notification (e.g. a notice/alert message 216 configured to provide results 222 to users) formed by community forum module 212 as described with respect to FIG. 4 may be communicated to an email account 118(a) designated in the association 220, in a user profile of Bob's and so forth. Bob may then access the notification via communication module 116(n) of the client 102(n) or alternatively using one or more other client devices configured to access the corresponding account 118(a). As noted, the notification may also be provided in a variety other ways, which includes but is not limited to instant messaging, text message, voicemail, pager, desktop alerts ("toast") and so on.

Figure 8:
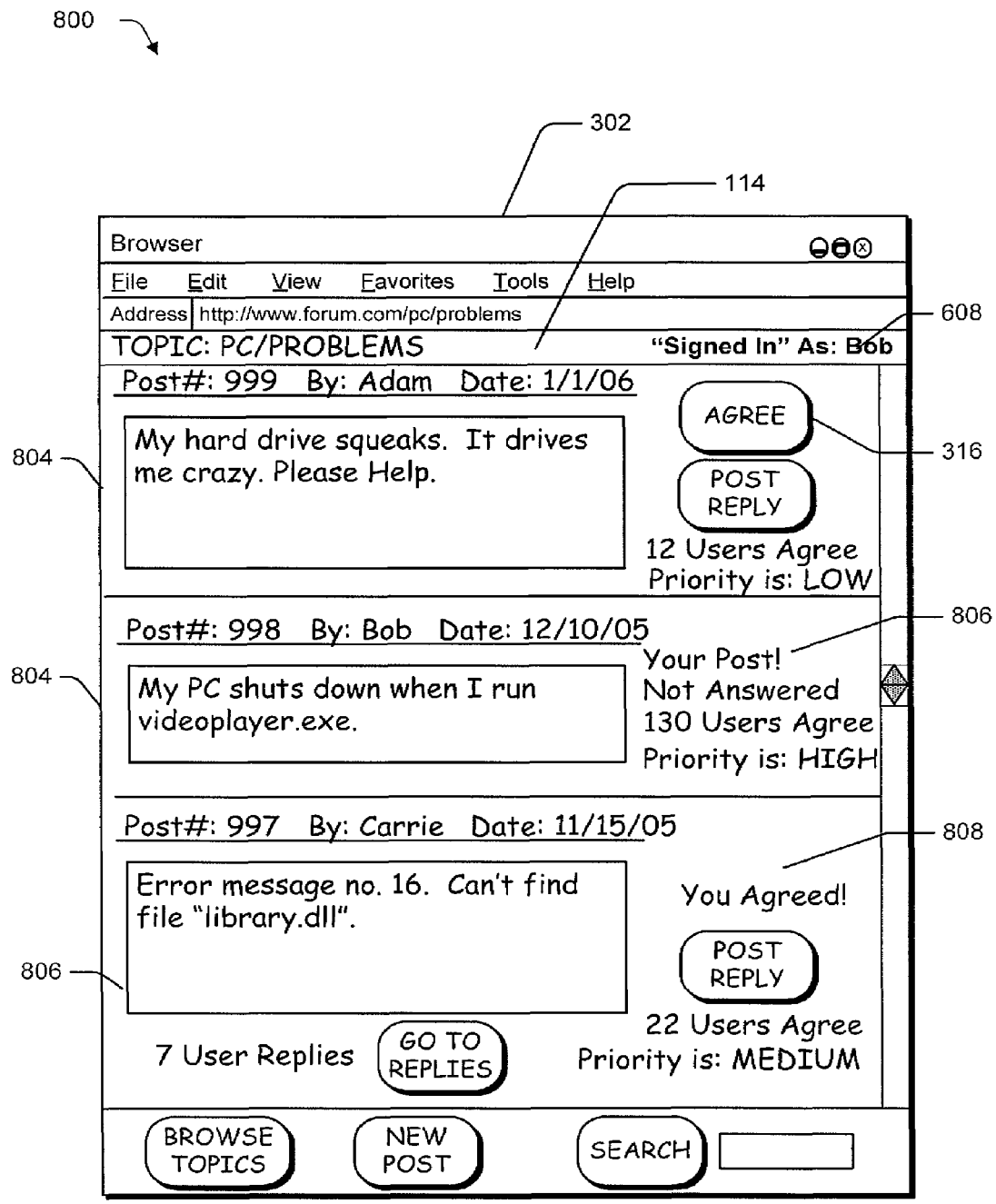
FIG. 8 is an illustration of an exemplary user interface that is operable to employ one or more techniques for community driven prioritization of customer issues described herein.

FIG. 8 further illustrates that the agree portion 316 may be selectively displayed with different postings in a user interface. For instance, agree portion 316 is displayed adjacent to portion 802 which corresponds to a posting #999 for which the signed in user "Bob" has neither originated or agreed with.

However, if a posting was originated by the signed-in user "Bob", then the agree portion 316 may be omitted, grayed out, or otherwise deemphasized. Portion 804 in FIG. 8 represents a posting #998 originated by "Bob" and accordingly the agree portion 316 is hidden or omitted. An indication 806 that the posting belongs to the signed in user may also optionally be provided in place of the agree portion 316.

Similarly, if a posting was already agreed to by the signed-in user "Bob" (previously selected a corresponding portion 316), then the agree portion 316 may be omitted, grayed out, or otherwise deemphasized. Portion 806 in FIG. 8 represents a posting #997 which "Bob" already agreed to and accordingly the agree portion 316 is hidden or omitted. An indication 808 that the posting has already been agreed to by the signed-in user may also optionally be provided in place of the agree portion 316.

Figure 9:
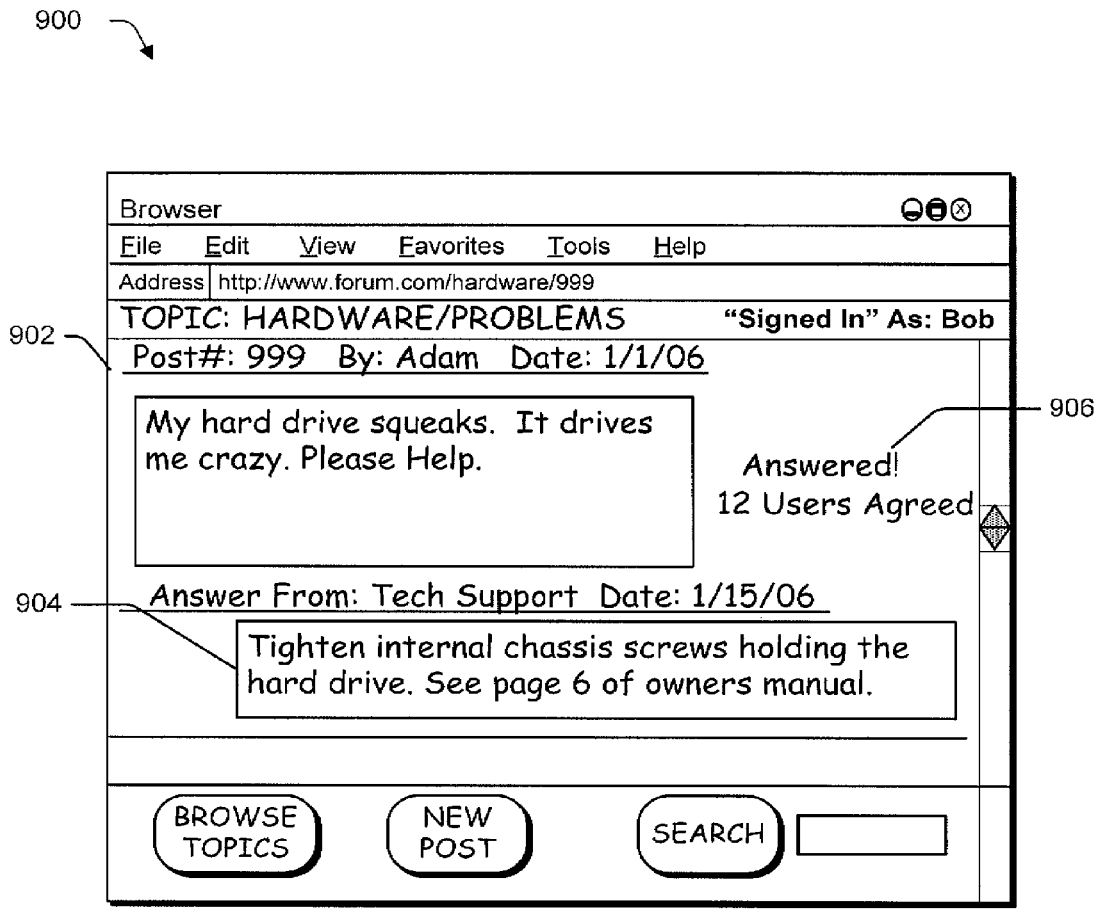
FIG. 9 another illustration of an exemplary user interface that is operable to employ one or more techniques for community driven prioritization of customer issues described herein.

FIG. 9 depicts an exemplary implementation 900 of a user interface which may be formed by a service and output by a client for a posting once results have been generated, e.g., for an answered support question or issue. In this implementation, the interface includes a portion 902 for displaying the original posting, such as the problem described in post #999 with a squeaky hard drive. The interface also includes a portion 904 for displaying an answer or other results generated by support staff or designees in response to the posting. In the depicted instance, support staff has generated results 222 which are instructions indicating "Tighten internal chassis screws holding the hard drive. See page 6 of owners manual." The results 222 may be stored as community forum data 214 and displayed in the portion 904 of a user interface, when posting #999 is accessed by a client 102(*n*). Naturally, the results 222 may have been produced by support staff based upon or following an alert message (e.g., notice/alert message 216 configured to communicate priorities of associated postings 218 to designated recipients) sent to designated support staff in response to a priority threshold trigger reached for posting #999, as described with respect to FIG. 5. The portion 904 may display the full results 222, links to the results 222 and/or external sources of information, a summary and so forth. In addition, when a posting has been answered, the agree portion 316 may be omitted, grayed out, or otherwise deemphasized. An indication 906 that the posting has been answered may also optionally be provided.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
   forming a user interface configured to expose a community forum to a plurality of clients such that the clients interact with postings in the community forum via a network;
   providing in the user interface a selectable portion associated with at least one user posting that is selectable by a user to:
   express agreement with the user posting; and
   associate with the user posting, and
   wherein selection of the portion causes updating of a counter configured to track a number of users associated with a posting and are used to determine which user posting is most important;
   responsive to a selection by the user of the selectable portion, storing data associating the user with the corresponding user posting on the community forum, such that the association describes a relationship between the user and the corresponding user forum; and
   determining the priority for generating a response to one or more user postings based upon one or more corresponding user associations, wherein the response is generated by an owner of the community forum, wherein the owner of the community forum automatically generates and sends a notification of the response to one or more users based on the determined priority.

2. The method as described in claim 1 further comprising:
   generating a response associated with one said user posting; and
   forming a notification of the response for communication via a network to a plurality of users associated with the posting by selection of a corresponding portion, wherein the notification indicates that the result is accessible in the community forum.

3. The method as described in claim 2, wherein the notification is provided to the plurality of users using one or more mode of communication selected from the group consisting of:
   email;
   instant messaging;
   text messaging;
   desktop alerts;
   pager; and
   voicemail.

4. The method as described in claim 3, wherein at least two different communication modes are used to notify two or more users associated with a posting, in accordance with preferred communication modes specified by the users.

5. The method as described in claim 1, wherein associations of one or more users to a posting are referenced to determine the users to which notification is provided, when a response is obtained for the posting.

6. The method as described in claim 1, wherein the posting describes a customer problem with a product and the response includes an answer to the customer problem.

7. The method as described in claim 1, wherein the posting describes a technical problem with an application module for a computing device and the response includes support instructions for troubleshooting the problem.

8. A method comprising:
   providing one or more selectable portions of a user interface configured for interaction of a plurality of clients with a community forum, wherein each selectable portion corresponds to a user posting in the community forum and is selectable by another user to:
   express agreement with the user posting; and
   associate with the user posting;
   storing a plurality of associations of users with the user posting in the community forum in response to user selections of the one or more selectable portions via the plurality of clients;
   determining the priority of one or more user postings based upon corresponding associations; and
   based upon the determined priority, forming an alert for communication to one or more recipients enlisted by a manager of the community forum to generate responses to the one or more user postings; and
   wherein selection of a portion causes updating of a counter configured to track a number of users associated with a corresponding posting, and the priority of the posting is determined based at least in part upon the counter.

9. The method as described in claim 8, wherein groups of recipients are arranged to correspond to successive threshold levels of priority for one or more posting, such that when priority of the respective posting escalates to reach each threshold level, the corresponding group of recipients is alerted.

10. The method as described in claim 8, wherein the alert is configured to present the priority for one or more postings to recipients, such that the alert enables recipients to prioritize their responses to the postings.

11. The method as described in claim 8, wherein the recipients enlisted to generate responses to postings include one or more of community experts, forum managers, customer service personnel, and technical support staff.

12. The method as described in claim 8, wherein:
   the community forum is directed to support for computing devices and software;
   at least one posting describes a technical problem with an application module for a computing device; and
   a corresponding response generated by the one or more recipients comprises support instructions for troubleshooting the technical problem with the application module.

13. A method comprising:

outputting on a client a user interface configured for interaction of a user with a community forum directed to technical support of one or more products and services;

displaying via the user interface at least one posting describing a technical problem with a product and a portion corresponding to the posting selectable to associate the user of the user interface with the posting; and in response to user selection of the portion, form a message for communication to a service via a network having data sufficient to:

express that the user experiences the technical problem; and associate the user with the posting;

determining a priority for generating an answer to the posting based on the data, such that when the determined priority escalates to reach a threshold level, a support staff receives an alert;

generating the answer corresponding to the posting by support staff enlisted to provide answers to technical problems with the products and services raised in the community forum responsive to receiving the alert; and the user receiving notification from the service when the answer to the technical problem is generated; and wherein the service, in response to the communicated data, stores an association of the user to the posting and updates a counter configured to track a number of users associated with the posting.

14. The method as described in claim 13 further comprising, receiving notification from the service when the answer to the technical problem is generated in response to the posting based upon association of the user with the posting via the users' selection of the portion.

15. The method as described in claim 14, wherein the posting describes the technical problem with an application module for a computing device and the answer includes support instructions for troubleshooting the problem.

\* \* \* \* \*